United States Patent
Riess

(10) Patent No.: US 6,209,882 B1
(45) Date of Patent: Apr. 3, 2001

(54) LIP SEAL FOR SEALING CYLINDRICAL SURFACES

(75) Inventor: Thomas Riess, Mürsbach (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/056,336

(22) Filed: Apr. 7, 1998

(30) Foreign Application Priority Data

Apr. 10, 1997 (DE) .............................................. 197 14 844

(51) Int. Cl.⁷ ...................................................... F16J 15/32
(52) U.S. Cl. ............................................ 277/562; 277/566
(58) Field of Search ................................. 277/436, 439, 277/549, 560, 562, 566

(56) References Cited

U.S. PATENT DOCUMENTS

| | | | |
|---|---|---|---|
| 3,228,705 | * 1/1966 | Underwood | 277/566 |
| 3,940,155 | 2/1976 | Baumle | 277/183 |
| 4,262,915 | * 4/1981 | Williams | 277/566 |
| 4,371,177 | 2/1983 | Bähr | 277/152 |
| 4,858,516 | * 8/1989 | Klein . | |
| 5,431,415 | * 7/1995 | Millonig | 277/560 |

FOREIGN PATENT DOCUMENTS

| | | | |
|---|---|---|---|
| 195 23 011 A1 | 1/1997 | (DE) | F16D/25/062 |
| 0 014 905 | 2/1980 | (EP) | F16J/15/32 |
| 810625 | 3/1959 | (GB) . | |
| 811485 | 4/1959 | (GB) . | |
| 974751 | 11/1964 | (GB) . | |
| 2 085 983 | 5/1982 | (GB) | F16J/15/32 |
| WO89/03954 | 5/1989 | (WO) | F16J/15/32 |

* cited by examiner

*Primary Examiner*—Anthony Knight
*Assistant Examiner*—Vishal Patel
(74) *Attorney, Agent, or Firm*—Cohen, Pontani, Lieberman & Pavane

(57) ABSTRACT

A lip seal for sealing cylindrical surfaces of a cylindrical housing and a axially movable piston within the housing includes an annularly arranged supporting bead on its outer diameter to improve its tilting behavior around a central axis running annularly through the center of the lip seal. A first sealing lip of the lip seal forms a seal on the cylindrical surface of the housing and a second sealing lip forms a seal on the cylindrical surface of the piston. The supporting bead, in the installed state, forms a contact seal in the cylindrical part of the housing. Together with the contact seals of the first sealing lip and the second sealing lip, the supporting bead lends stability against tilting to the lip seal. Advantageously, a good sealing quality of the lip seal is maintained during an increased number of load changes.

4 Claims, 1 Drawing Sheet

LIP SEAL FOR SEALING CYLINDRICAL SURFACES

BACKGROUND OF THE INVENTION

1. Field of the Invention

The invention relates to a lip seal for sealing cylindrical surfaces, especially those of input and output hydraulic cylinders in motor vehicles, axially fixed in a cylindrical part of a cylinder housing with a first sealing lip directed against the cylinder housing and a second sealing lip directed against a cylindrical surface of a piston which is axially movably within the cylinder housing.

2. Description of the Related Art

German reference DE 195 23 011 A1 discloses a hydraulic clutch release device for a friction clutch having a housing. A telescopic piston including a primary piston and a secondary piston is arranged in a central recess, of the housing for the purpose of attaining reduced structural length. The primary piston has a lip seal with an inwardly directed sealing lip and an outwardly directed sealing lip on its ring-shaped front face. The lip seal is mounted and held in its position with the primary piston in an annular groove in the front face of the primary piston. This fixing of the lip seal is required to neutralize tilting moments that occur as the result of the translatory movements in different directions of the outer cylindrical surface relative to the inner cylindrical surface.

SUMMARY OF THE INVENTION

The lip seal proposed by the present invention has very small radial dimensions, relative to the ratio of its inner diameter to its outer diameter. The thin dimensions make it impossible to fix the lip seal in its position by a ring groove or to rule out tilting movements of the lip seal which occur due to the movement of an inner piston relative to the housing, in which the lip seal is arranged. Furthermore, lip seals without a fitting are instable because of the constantly changing pressure conditions they are subjected to, and react with tilting movements around a ring axis that runs annularly through a center of the lip seal.

The object of the invention is therefore to prevent tilting movement around an central axis that runs annularly though a center of a non-fitted lip seal with at least one sealing lip during translatory movements and changing pressure conditions.

The attainment of this object includes a lip seal axially fixed in a cylindrical part of a cylinder housing with a first sealing lip directed against the cylinder housing and a second sealing lip directed against a cylindrical surface of a piston which is axially movably within the cylinder housing. The lip seal also includes a supporting head which forms a third contact seal against the cylindrical part of the housing.

The various features of novelty which characterize the invention are pointed out with particularity in to claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

An example of a lip seal is explained in reference to two drawings, wherein the drawings.

DETAILED DESCRIPTION OF THE PRESENTLY PREFERRED EMBODIMENTS

Figure 1:
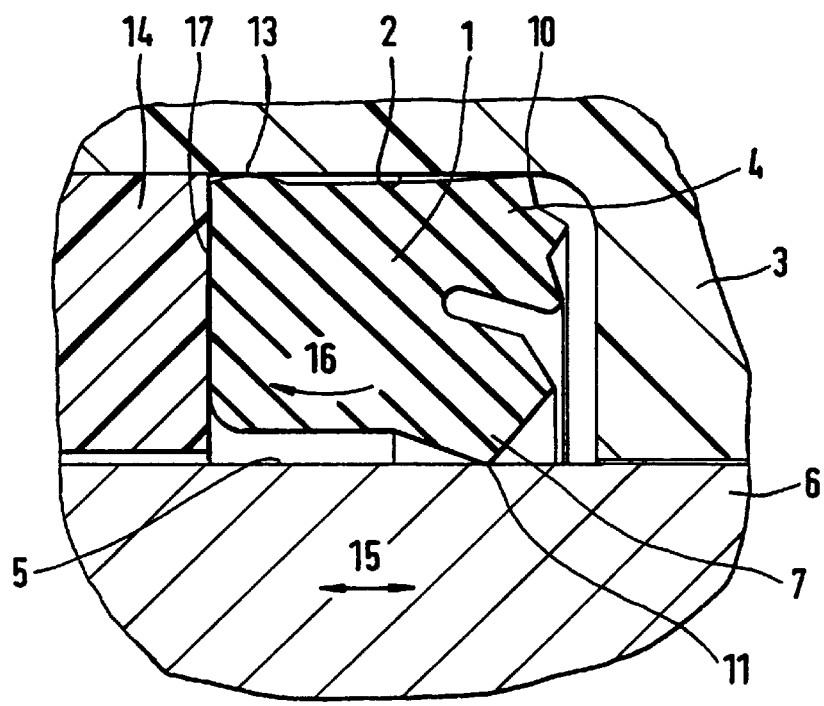
FIG. 1 shows a section of the lip seal according to the invention in the installed state in a housing with a longitudinally movable piston.
Figure 2:
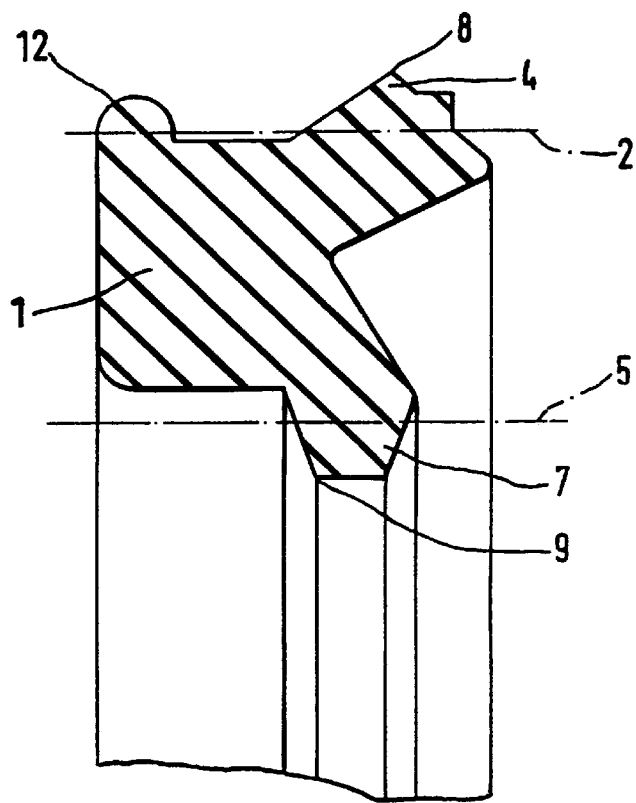
FIG. 2 shows a section of the lip seal in FIG. 1, with a first, outwardly directed sealing lip and a second, inwardly directed sealing lip as well as with a supporting bead on the circumference of the outer diameter.

Referring to FIGS. 1 and 2, a lip seal 1 for sealing cylindrical surfaces, is intended for installation in a cylindrical part 2 of a housing 3. This embodiment of the lip seal 1 carries a first, outwardly directed sealing lip 4 and a second, inwardly directed sealing lip 7. The first sealing lip 4 has an outer sealing edge 8, and the second sealing lip 7 has an inner sealing edge 9. In FIG. 1, the lip seal 1 is secured in the housing 3 with a stop ring 14, which has a ring-shaped stop surface 17 that is in contact with a plane-parallel front face of the lip seal 1. A piston 6 is axially movably arranged in a boring of the housing 3 for moving in a movement direction 15.

In FIG. 2, sealing lip 1 is in a relaxed state in which the diameter of the first sealing lip 4 extends farther out past the position normally occupied by the cylindrical part 2 of the housing. Similarly, the second sealing lip 7 extends radially far inward past the position normally occupied by the cylindrical surface 5 of the piston 6. In the installed state shown in FIG. 1, the first sealing lip 4 is thus moved inward, while the second sealing lip 7 is moved outward, such that the outer sealing edge 8 forms a first contact seal 10 with the cylindrical part 2 of the housing 3. Similarly to the first sealing lip 4, the second sealing lip 7 forms a second contact seal 11 with its inner sealing edge 9. The forces arising during the deformation of the sealing lips 4 and 7 roughly neutralize each other.

If pressure builds up in the space remaining around the sealing lips 4 and 7 during the movement of the piston 6 in one of the two movement directions 15, then the lip seal 1 experiences a tilting movement 16 because of its outer shape and because of the movements of the piston 6 relative to the housing 3. The tilting movement 16 is around a central axis that runs annularly through the center of the lip seal, specifically, a tilting movement in a clockwise rotational direction. The pressure conditions in the area of the sealing lips 4 and 7 and the longitudinal movements of the piston exercise influence on the tilting movements.

To minimize or eliminate the tilting movement direction 16, a supporting bead 12 is arranged on the outer diameter of the lip seal 1 and has a ring-shaped cross-section on the entire circumference of the lip seal 1. The supporting bead 12 is arranged close to the plane-parallel front face of the lip seal 1 on the outer diameter of the lip seal 1 in encircling fashion. Therefore, supporting bead 12 is located at a greater distance from the first sealing lip 4 in the axial direction than from the second sealing lip 7. In the installed state, the supporting bead 12 forms a third contact seal 13 relative to the cylindrical part 2 of the housing 3. The supporting bead receives the pressure force of the lip seal 1 in the installed state and is thereby sharply deformed and compressed relative to the cylindrical part 2 of the housing 3 in the installed state. As a result, the lip seal 1 is stably fixed on the cylindrical part 2 of the housing 3 with two contact seals 10 and 13 and on the cylindrical surface 5 of the piston 6 with the contact seal 11 and thus prevented from turning around an axis that runs annularly in the center of the lip seal 1. Because of these measures, the lip seal 1 is not directed and pressed against the stop surface 17 during each pressurization of the lip seal 1 in the housing 3, only to again assume its original tilted state when the pressure is eliminated. Because the lip seal 1 is exposed to a large number of load changes, such constant tilting in the prior art devices leads to increased scrape leakage between the sealing edges 8 and 9, as a result of which the medium slowly moves over from one space to the other.

The advantage of the supporting bead 12 lies in its two-fold function: First, forming a third additional contact seal 13 relative to the cylindrical part 2 of the housing 3, and second, preventing the tilting movement of the lip seal 1 around its annular central axis.

The invention is not limited by the embodiments described above which are presented as examples only but can be modified in various ways within the scope of protection defined by the appended patent claims.

I claim:

1. A lip seal for being axially fixable in a cylindrical part of a housing and creating a seal between a first cylindrical surface of a cylindrical housing and a second cylindrical surface of a piston, comprising:

a first sealing lip directable against the first cylindrical surface of the housing for forming a first contact seal;

a second sealing lip directable against the second cylinder surface of the piston for forming a second contact seal, wherein said first sealing lip and said second sealing lip are directable against the first and second cylinder surfaces for forming a seal between spaces with different media and pressures; and a supporting bead on an outer diameter of the lip seal for forming a third contact seal against the first cylindrical surface of the housing, wherein said second sealing lip is arranged axially between said first sealing lip and said supporting bead and said second contact seal being the sole portion of said lip seal arranged for contacting said second cylinder surface of the piston.

2. The lip seal of claim 1, wherein said lip seal comprises a stop surface at one axial side of the lip seal and the supporting bead is arranged closer to the stop surface than to said first sealing lip.

3. The lip seal of claim 1, wherein the supporting bead comprises an encircling semi-circular cross-section on the outer diameter of the lip seal.

4. The lip seal of claim 1, wherein a prestress of the first, second, and third contact seals exert a stable equilibrium of forces on the lip seal when the lip seal is in the installed state.

* * * * *